US012602362B2

(12) United States Patent
Bandlamudi et al.

(10) Patent No.: US 12,602,362 B2
(45) Date of Patent: Apr. 14, 2026

(54) MICROSERVICE CATALOG GENERATION AND INFERENCE BASED SELECTION OF MICROSERVICES

(71) Applicant: International Business Machines Corporation, Armonk, NY (US)

(72) Inventors: Jayachandu Bandlamudi, Guntur (IN); Sreenivasa Rao Pamidala, McLean, VA (US); Subil Mathew Abraham, Lewisville, TX (US)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 18/084,649

(22) Filed: Dec. 20, 2022

(65) Prior Publication Data

US 2024/0202177 A1     Jun. 20, 2024

(51) Int. Cl.
*G06F 16/22* (2019.01)
*G06F 16/2455* (2019.01)
*G06N 20/00* (2019.01)

(52) U.S. Cl.
CPC .... *G06F 16/2237* (2019.01); *G06F 16/24553* (2019.01); *G06N 20/00* (2019.01)

(58) Field of Classification Search
CPC ........... G06F 16/2237; G06F 16/24553; G06F 16/9024; G06N 20/00; G06N 3/045
See application file for complete search history.

(56) References Cited

U.S. PATENT DOCUMENTS 10,721,791 B1     7/2020 Gamliel et al.
11,397,575 B2 *   7/2022 Wan ........................ G06F 9/547
(Continued)

FOREIGN PATENT DOCUMENTS

CN     109948710 B     3/2021
CN     109961204 B     4/2021
(Continued)

OTHER PUBLICATIONS

"A Unified Microservice Catalog Tool", DeployHub, accessed online Oct. 7, 2022, 10 pages.
(Continued)

*Primary Examiner* — Merilyn P Nguyen
(74) *Attorney, Agent, or Firm* — Aaron N. Pontikos

(57) ABSTRACT

Mechanisms are provided for indexing microservices for optimized querying based on microservice attributes. A plurality of application graph data structures are generated with nodes representing microservices and edges representing functionality of microservices. A data transformation is performed on the graphs to generate, for each node, a corresponding microservice document specifying microservice attributes of the corresponding microservice. A machine learning training operation is executed on an embedding computer model based on a plurality of the microservice documents to train the embedding computer model to learn a representation vector space for representing microservices as vector representations. The trained embedding computer model is executed on the microservice documents to generate corresponding vector representations and compile them into entries of a microservice index data structure which is used to process queries for microservices.

20 Claims, 7 Drawing Sheets

(56) References Cited

U.S. PATENT DOCUMENTS

| | | | | |
|---|---|---|---|---|
| 12,034,747 | B2 * | 7/2024 | Raghavendra | ....... G06N 3/0442 |
| 12,147,886 | B2 * | 11/2024 | Wan | .......................... G06N 3/08 |
| 2021/0232390 | A1 * | 7/2021 | Hwang | ............... H04L 41/0803 |
| 2021/0287108 | A1 * | 9/2021 | Hwang | ............... G06F 11/3616 |
| 2021/0289046 | A1 | 9/2021 | Sinha | |
| 2022/0060431 | A1 | 2/2022 | Vadayadiyil Raveendran et al. | |
| 2022/0172067 | A1 * | 6/2022 | Kang | ................... G06N 3/0442 |
| 2024/0386054 | A1 * | 11/2024 | Wouhaybi | ............... H04L 45/16 |

FOREIGN PATENT DOCUMENTS

| | | |
|---|---|---|
| CN | 112948137 A | 6/2021 |
| CN | 113051446 A | 6/2021 |
| KR | 20220029011 A | 3/2022 |

OTHER PUBLICATIONS

"An Open Source Microservice Catalog for Supply Chain Management", Ortelius, accessed online Oct. 7, 2022, 4 pages.
"Cosine similarity", Wikipedia, last edited on Sep. 5, 2022, accessed online Oct. 7, 2022, 7 pages.
"GraphQL", Current Working Draft, Dec. 8, 2022, 176 pages.
"Microservices Catalog App", GitHub, accessed online Oct. 7, 2022, 15 pages.
"Service Catalog—OpsLevel", OpsLevel, accessed online Oct. 7, 2022, 7 pages.
"The Istio service mesh", Istio, accessed online Dec. 13, 2022, 7 pages.
"Use Case: API & Services Catalog", LeanIX, accessed online Oct. 7, 2022, 14 pages.
Anand, Vishal, "Containers interoperability: How compatible is portable?", IBM Corporation, IBM Developer, Mar. 26, 2021, 14 pages.
Kovan, Gerry, "A Zero Trust Approach for Securing the Supply Chain of Microservices Packaged as Container Images", Medium, accessed online Oct. 7, 2022, 9 pages.
Richardson, Chris, "Pattern: API Gateway / Backends for Frontends", Microservices.io, accessed online Dec. 13, 2022, 4 pages.
Richardson, Chris, "Pattern: Microservice Architecture", Microservices.io, accessed online Oct. 7, 2022, 6 pages.
Shperber, Gidi, "A gentle introduction to Doc2Vec", Medium, Jul. 26, 2017, 10 pages.

* cited by examiner

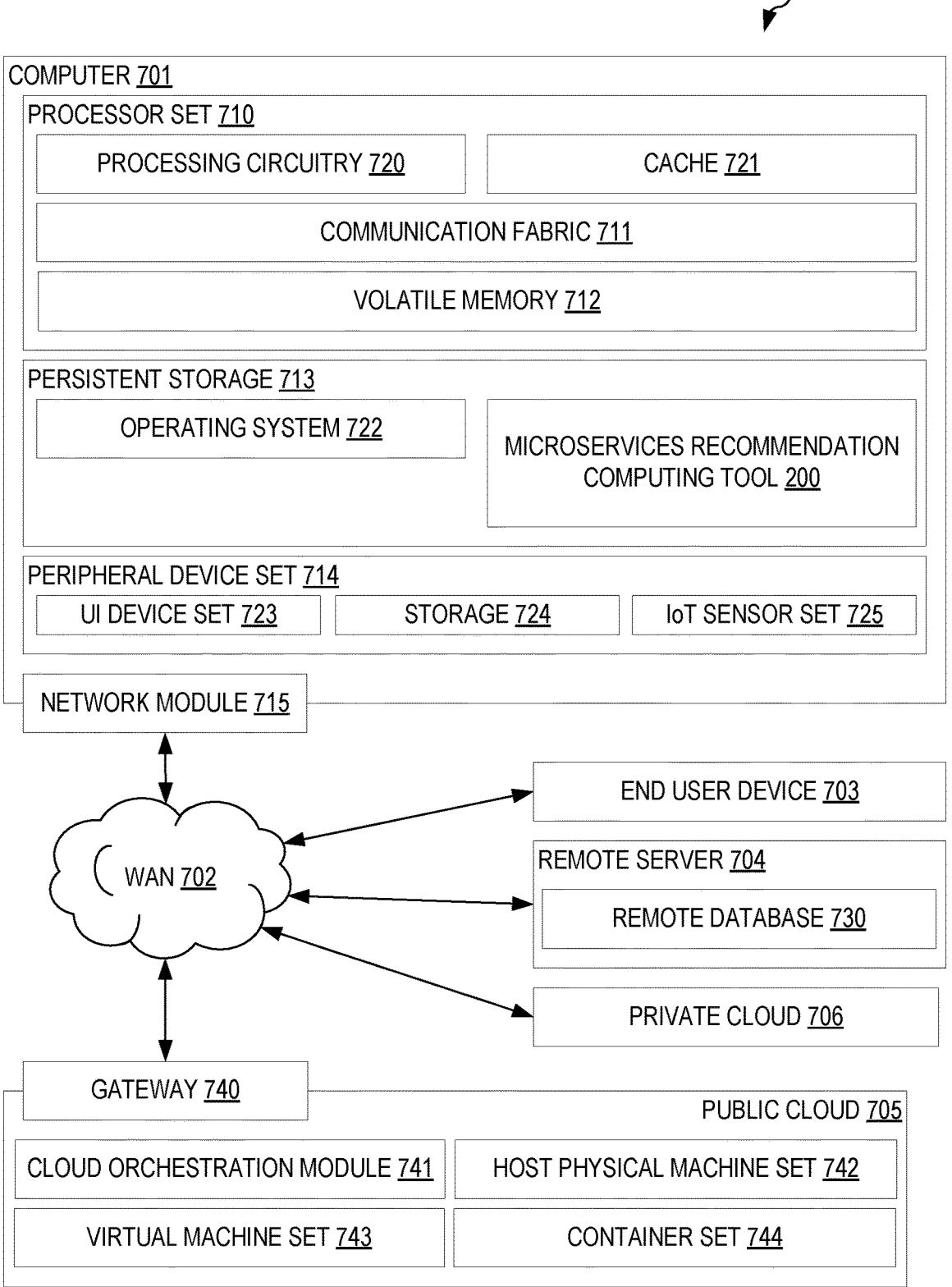

700

COMPUTER 701

PROCESSOR SET 710

PROCESSING CIRCUITRY 720          CACHE 721

COMMUNICATION FABRIC 711

VOLATILE MEMORY 712

PERSISTENT STORAGE 713

OPERATING SYSTEM 722          MICROSERVICES RECOMMENDATION COMPUTING TOOL 200

PERIPHERAL DEVICE SET 714

UI DEVICE SET 723          STORAGE 724          IoT SENSOR SET 725

NETWORK MODULE 715

WAN 702

END USER DEVICE 703

REMOTE SERVER 704

REMOTE DATABASE 730

PRIVATE CLOUD 706

GATEWAY 740

PUBLIC CLOUD 705

CLOUD ORCHESTRATION MODULE 741          HOST PHYSICAL MACHINE SET 742

VIRTUAL MACHINE SET 743          CONTAINER SET 744

*FIG. 7*

MICROSERVICE CATALOG GENERATION AND INFERENCE BASED SELECTION OF MICROSERVICES

BACKGROUND

The present application relates generally to an improved data processing apparatus and method and more specifically to an improved computing tool and improved computing tool operations/functionality for automatically generating a microservice catalog and indexing the microservice catalog such that inference based selection of microservices can be performed.

Microservices (or microservices architecture) are an architectural and organizational approach to application development in which a single application is composed of many loosely coupled and independently deployable smaller components, or services. These services typically have their own technology stack, inclusive of the database and data management model, communicate with one another over a combination of REST APIs, event streaming, and message brokers, and are organized by business capability, with the line separating services often referred to as a bounded context. Each microservice may be owned by a small, self-contained team of developers. The use of microservices as components for a larger application makes applications easier to scale and improves development time.

While much of the discussion about microservices revolves around architectural definitions and characteristics, their value can be more commonly understood through business and organizational benefits. That is, with microservices architectures, code can be updated more easily as new features or functionality can be added without touching the entire application, i.e., changing only the microservice to add/remove/update functionality. Moreover, with microservices architectures, development teams can use different stacks and different programming languages for different components (microservices). In addition, with microservices architectures, components can be scaled independently of one another, reducing the waste and cost associated with having to scale entire applications because a single feature might be facing too much load.

Microservices may also be understood by what they are not. The two comparisons drawn most frequently with microservices architecture are monolithic architecture and service-oriented architecture (SOA). The difference between microservices and monolithic architecture is that microservices compose a single application from many smaller, loosely coupled services as opposed to the monolithic approach of a large, tightly coupled application that operates as a single service. The differences between microservices and SOA can be a bit less clear. While technical contrasts can be drawn between microservices and SOA, it is easier to consider the difference as one of scope. While SOA is an enterprise-wide effort to standardize the way all web services in an organization communicate and integrate with each other, microservices architecture is an application-specific mechanism that provides a self-contained functionality that may be added to applications to provide that self-contained functionality to the overall application.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a computer implemented method, in a data processing system, is provided for indexing microservices for optimized querying based on microservice attributes. The method comprises generating a plurality of application graph data structures. Each node in an application graph data structure specifies a corresponding microservice and has corresponding microservice attribute information, and each edge between nodes in the application graph data structure specifies a microservice functionality between microservices of nodes connected by the edge. The method further comprises executing a data transformation operation on the application graph data structures to generate, for each node in each application graph data structure, a corresponding microservice document specifying microservice attributes of the corresponding microservice. The method also comprises executing a machine learning training operation on an embedding computer model based on a plurality of the microservice documents. The machine learning training operation trains the embedding computer model to learn a representation vector space for representing microservices as vector representations. Moreover, the method comprises executing the trained embedding computer model on the plurality of microservice documents to generate corresponding vector representations, compiling the vector representations into entries of a microservice index data structure, and processing queries for microservices based on the vector representations in the entries of the microservice index data structure.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 is an example diagram of a distributed data processing system environment in which aspects of the illustrative embodiments may be implemented and at least some of the computer code involved in performing the inventive methods may be executed.

DETAILED DESCRIPTION

Figure 1:
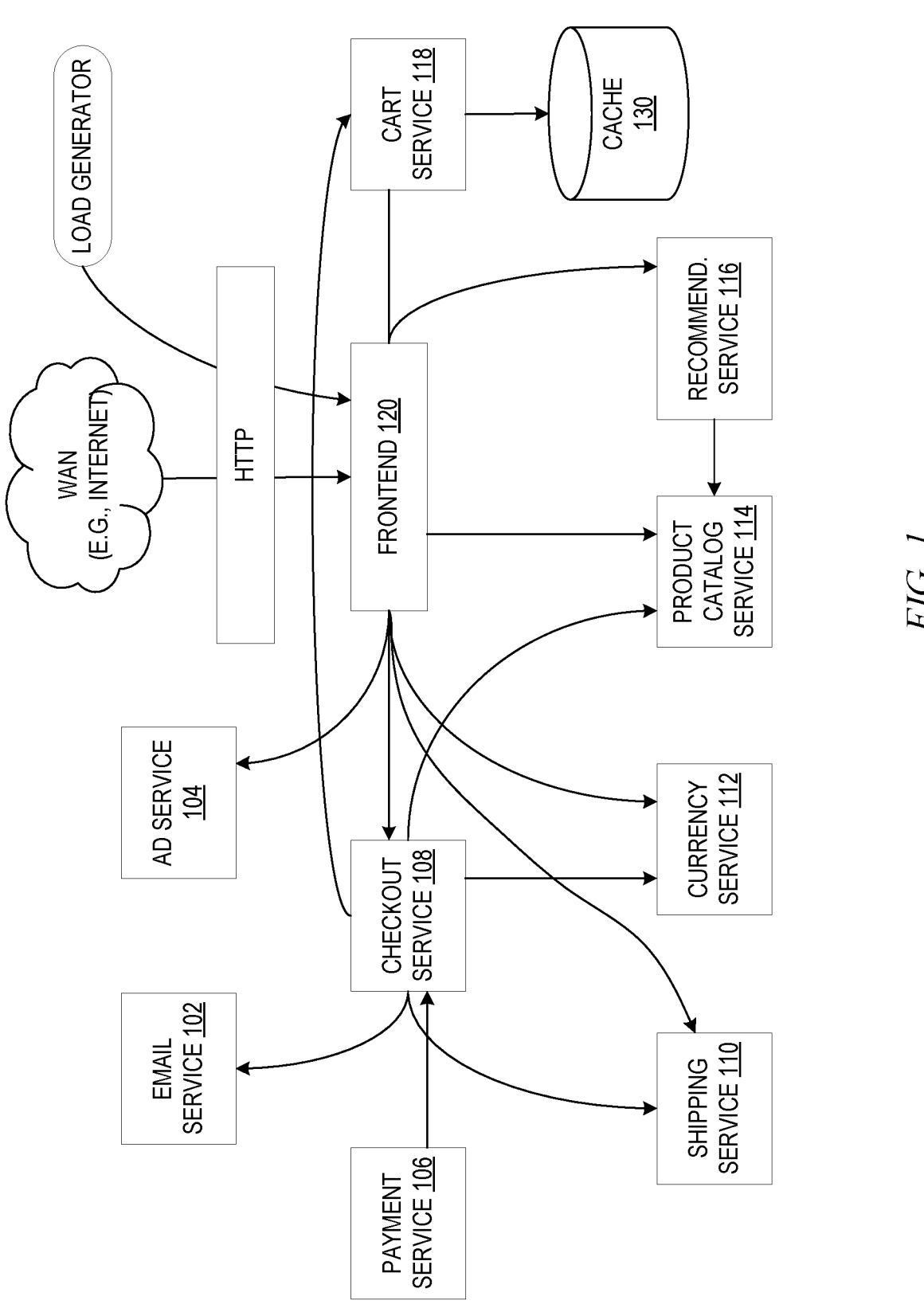
FIG. 1 is an example diagram of a composite application comprising multiple microservices.

Microservices have become increasingly popular recently such that modern application development teams are decomposing large monolith applications into microservices for a variety of reasons, including modularity, improved scalability, maintainability, and faster deployment. However, it is a challenge for these development teams to properly leverage microservice resources when designing and building composite applications, i.e., applications comprised of a plurality of microservices. For example, microservices are owned by different organizational department development teams and it is difficult to gain a holistic insight into the design patterns and principles used in these microservices, especially when the organizations can potentially own hundreds or even thousands of microservices that may be spread across multiple different organizations and development teams within the organization. As a result, development teams end up using different architectural styles, technologies and patterns which results in reduced efficiency and increased operational complexity.

With these issues in mind, the illustrative embodiments provide a solution to these issues by providing an improved computing tool and improved computing tool functionality/ operations that automatically generate a microservice catalog and index the microservice catalog such that inference based selection of microservices can be performed. That is, the improved computing tool of the illustrative embodiments can intelligently index existing microservices by considering several modalities related to design patterns, functionality, application architecture, schema, and runtime attributes. The illustrative embodiments provide an artificial intelligence (AI) based inference capability for searching microservices catalogs, which implements a similarity analysis, rather than requiring exact text matching based on user queries. That is, rather than returning no result because an exact match to a user query is not found in a microservices catalog, the inference capabilities and similarity analysis of the illustrative embodiments permits similar microservices to be identified and presented as potential solutions to the query even though those microservices may not be an exact match to the query.

The improved computing tool and improved computing tool functionality/operations include a microservices feature extraction and graph representation generator that operates on existing composite applications and/or individual microservices, to extract microservice metadata for the microservices in the composite application and/or individual microservices, and identify a set of attributes of the microservice that may be used for representing the microservice with regard to its design principles, architecture, schema, and deployment characteristics. The identified attributes for the various microservices are transformed, using data transformation algorithms, to generate a graph representation of the microservices where nodes represent microservices having corresponding attributes, and edges that represent interfaces and dependencies between microservices. Multiple graphs may be generated, each for a different application.

With the improved computing tool and improved computing tool functionality/operations, a vector representation generation engine, which is referred to herein as "Microservice2Vec", or MS2Vec for short, implements a neural network computer model that converts the graph representation of an application to one or more vector representations of microservices present in the graph data structure for that application. The vector representations comprise numerical values in vector slots that represent the various attributes of the microservice across multiple modalities. Once the vector representations of the microservices are generated, a search index record may be generated for each of the microservices based on its corresponding vector representation, where this search index record may include searchable information such as the microservice ID, microservice metadata information, and vector representation, such that the data record of each microservice can be retrieved by using a corresponding microservice ID.

The improved computing tool and improved computing tool functionality/operations further include a similarity inferencing engine that operates on a user specification of desired microservice attributes, performs a similarity search, and generates recommendations for microservices that may satisfy the criteria of the user specification. The similarity inferencing engine may again use the MS2Vec engine to convert the user specification to a vector representation and perform a similarity analysis on the user specification vector representation with the vector representations of the cataloged and indexed microservices to generate measures of similarity which may be used to rank the top-most similar microservices, e.g., using a cosine similarity analysis, or other suitable similarity analysis, to determine a distance measure that is then used to rank microservices from shortest distance to longest distance and select a top-K number of microservices as possible similarity candidates for the user specification.

Having obtained a ranked recommendation of microservices that are most similar to the criteria in the user's specification for a desired microservice, the user, e.g., development team member, may select a microservice from the recommendation and retrieve the microservice from a microservice repository. The user may then reuse the microservice with respect to their user specification in the application under development. Moreover, the user may modify the microservice as desired, via their development computing environment, to create a new microservice which may then be stored in the repository and cataloged and indexed for searching via the mechanisms of the illustrative embodiments. Thus, the recommendations of similar microservices, taking into account a plurality of modalities of microservice attributes, assists developers in efficiently creating applications using existing microservices as potentials for reuse or as a baseline for the creation of new microservices.

Because the illustrative embodiments provide an improved computing tool and improved computing tool functionality/operations that promote reuse of existing microservices and efficient identification of microservices that satisfy user requirements based on similarity rather than exact matching, the illustrative embodiments significantly reduce costs to organizations for generating and deploying applications. In particular, development costs and development time are reduced while promoting modularity of applications by the increased use of microservices and reuse of microservices which requires fewer modules to be tested, i.e., reusing existing microservices means that these microservices may not need to be tested, or the extent of the testing may be minimized. Furthermore, the illustrative embodiments promote faster delivery of organization capability and increase code quality, security, and operations costs by reusing microservices that have already been certified and verified with regard to each of these considerations.

By making microservice reuse more flexible through similarity searching based on the catalog and index mechanisms of the illustrative embodiments, reusability of microservices is promoted which in turn promotes consistent standards for development, design patterns, and non-functional characteristics, such as security, availability, and scalability, with regard to microservices. In addition, the illustrative embodiments help to reduce attack surfaces and removes security blind spots through continuous security and smaller code base, while lowering the external dependencies. That is, in some illustrative embodiments, as noted above, each application may be converted to nodes in a graph with meta information, such as meta information specifying various characteristics of design principals, runtime, and non-functional characteristics. In these illustrative embodiments, the MS2Vec embedding is leveraged to convert the attributed graphs to numerical features and similarity measures, such as cosine similarity, for example, may be used to identify microservices that are most similar to each other with respect to security scheme characteristics. In this way, the best possible security schemes followed by existing microservices may be identified and recommended to avoid security blind spots, reduce surface attacks, and other security concerns.

In addition, the illustrative embodiments allow developers to identify non-compliant microservices in terms of design patterns, security and compatibility. That is, once the MS2Vec embedding engine is trained to learn a representation vector space for microservices, the similarity measures may be used to identify microservices that are similar or compliant with each other. The microservices that are dissimilar or non-compliant will be further apart in distance and similarity measures, and thus, may be identified based on these distance or similarity measures and established thresholds on distance/similarity, for example.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

As noted above, the illustrative embodiments provide an improved computing tool and improved computing tool functionality/operations for generating a microservices catalog and corresponding index that is searchable by an inference or similarity based computer model, and which provides recommendations as to microservices that are similar to query criteria. The illustrative embodiments promote microservice reuse and efficient development of applications at the organization level where, during design time, microservice design is primarily influenced by the current application functionality and often microservice re-use and inefficiencies are overlooked. The improved computing tool of the illustrative embodiments, on the other hand, provides improved functionality and operations to intelligently index existing microservice architectures and enable searches on microservices by specifying schema and functionality in user, e.g., development team member, queries. When developers are building new applications, they can search the microservice index and reuse the existing microservices.

In some illustrative embodiments, the mechanisms of the illustrative embodiments can recommend steps to mitigate microservice design inefficiencies and best practices using microservice similarity analysis. That is, a composite application is made of multiple microservices and each microservice plays an important role in determining the efficiency of the entire application. Thus, when teams are building such composite applications, they can leverage the mechanisms of the illustrative embodiments to identify or discover new microservices from a microservice registry that can provide the needed functionality, but also recommend the right microservice (e.g., a payment microservice) for the application based on the overall goal or non-functional requirements of the functionality and composite application obtained from the client. The recommendations may, for example, specify which microservice(s) will provide higher availability or consistency based on the requirements in the user query. To present best practices, the illustrative embodiments leverage the trained embedding model (MS2Vec) and use a similarity measure, such as cosine similarity, to find the most similar microservices with respect to scalability and recommend them.

FIG. 1 is an example diagram of a composite application comprising multiple microservices. As can be seen from FIG. 1, the composite application 100 is comprised of a plurality of microservices 102-118 along with a frontend 120 and cache storage 130. The example shown is a "online ordering app" which uses a combination of several micro services, including an email service 102, an advertisement (ad) service 104, a payment service 106, a checkout service 108, a shipping service 110, a currency service 112, a product catalog service 114, a recommendation service 116, and a cart service 118 for its operation. At an application level, these services 102-118 have various dependencies and interfaces with each other as represented by the arrows connecting the various services with each other, the fronted 120, and the cache 130, where these dependencies and interfaces are based on the specific functionality of the composite application 100. At an organization level, there will be tens of applications using a few hundred microservices, with the applications potentially being owned and developed by different departments within the organization, which may not communicate the microservices that they have developed or the applications that they have developed to all the other departments. Thus, there is a hinderance to microservice reuse due to a lack of communication between developers of applications and the lack of an intelligent mechanism to catalog, index, and provide an inference based similarity search capability specifically for microservices.

The illustrative embodiments provide an improved computer tool that creates multi-model based search indexes for microservices, in a catalog of microservices, using application programming interface (API) schema, design patterns, application architecture, microservice functionality, runtime, and other attributes of the microservice. These are only examples of possible attributes of microservices that may be included in the catalog of microservices upon which indices may be developed and other attributes may be used in addition to, or in replacement of, these attributes without departing from the spirit and scope of the present invention.

As an example of the microservice attributes, the API schema provides a description about the functionality of the microservice, such as OpenAPI specification (formerly Swagger Specification) is an API description format for REST APIs. An OpenAPI file allows one to describe the entire API including available endpoints and operations on each endpoint, operation parameters input and output for each operation, authentication methods, contact information, license, terms of use and other information.

As another example of microservice attributes, the application architecture describes the patterns and techniques used to design and build an application. The architecture gives a roadmap and best practices to follow when building an application, so that one ends up with a well-structured application. There are many different types of application architectures, but the most prominent currently, based on relationships between microservices are monoliths, N-tier architecture (tightly coupled), microservices (decoupled), event-driven architecture, and service-oriented architecture (loosely coupled).

In another example, the runtime may represent the various systems or environments in which the microservice may execute. At the application level, runtime may represent the runtime of the programming language framework, such as JavaScript, Python, C, C++, etc. At the platform level, the runtime may represent runtime platforms such as container environments (e.g., Docker, CRIO Kubernetes, etc.), server-less/FaaS environments, and the like. At the infrastructure level, runtime may represent runtime environments such as Linux, Windows, MacOS, etc. Any or all of these types of runtime information may be included in the catalog of microservices for each microservice.

The illustrative embodiments further provide a machine learning trained computer model that converts multi-modal attributes of microservices to a vector representation for performing similarity analysis. The illustrative embodiments further provide mechanisms for searching for microservices based on similarity analysis and for generating recommendations of microservices based on the determined similarities between microservices and criteria specified in a provided specification of desired microservice attributes. That is, once the microservices catalog and corresponding index is created using the mechanisms of the illustrative embodiments, then during an application development phase, developers can query the index and look for microservices that match their needs by submitting a search query and utilizing the mechanisms of the illustrative embodiments to convert the search query to a vector representation which is then used to perform a similarity search of the vector representations of microservices in the index. The top-ranked most similar microservices may then be returned as recommendations for use by the developer in developing the composite application.

Figure 2:
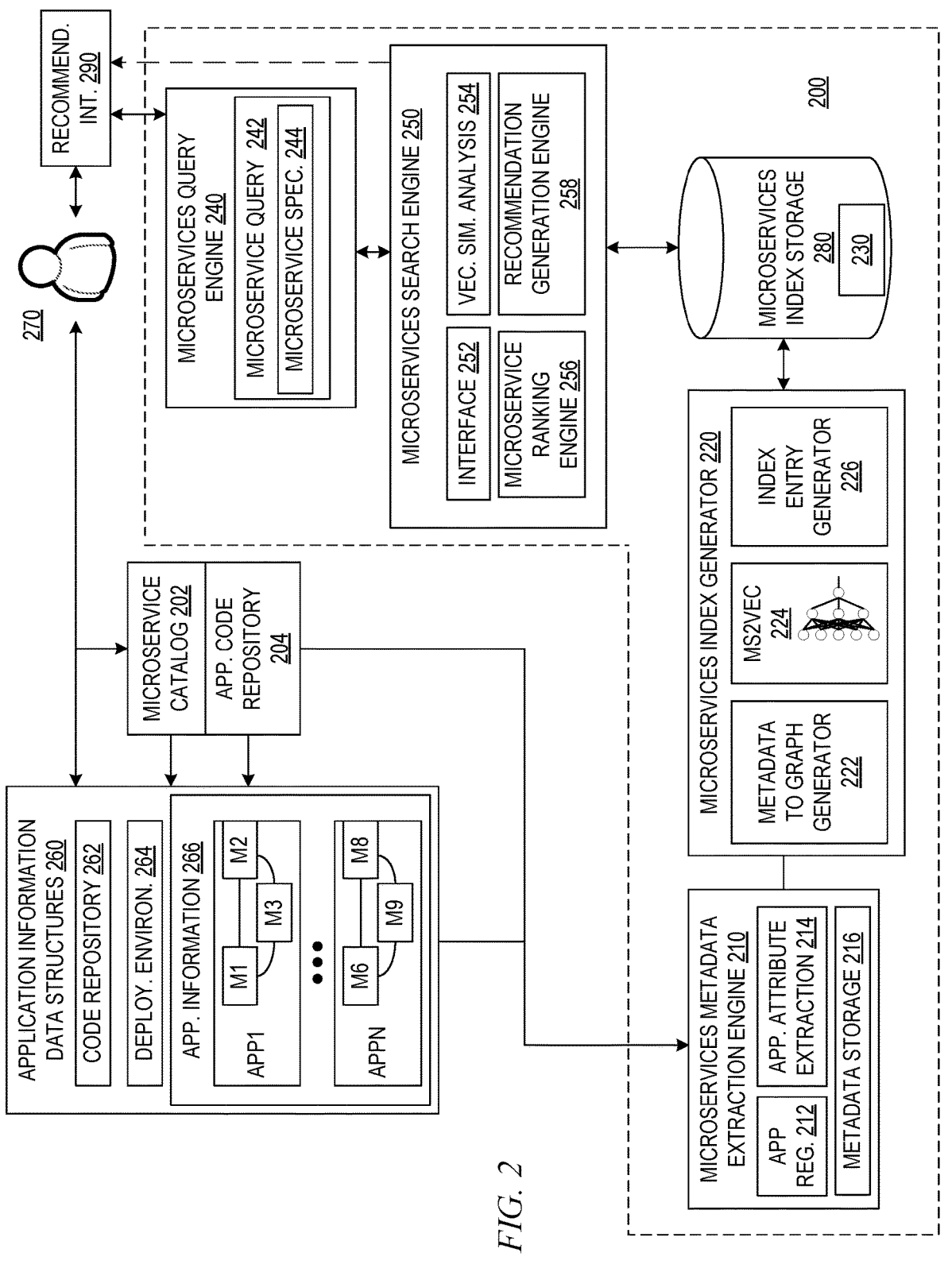
FIG. 2 is an example diagram illustrating the primary operational elements of a microservices recommendation system in accordance with one illustrative embodiment.

FIG. 2 is an example diagram illustrating the primary operational elements of a microservices recommendation computing tool in accordance with one illustrative embodiment. The blocks shown in FIG. 2 are intended to represent specific computer elements implemented either as software instructions loaded into one or more memories and executed by one or more processors, dedicated computer hardware devices in which logic is hardwired into the circuitry of the device to perform the attributed functions/operations, or any combination of executed software instructions and dedicated hardware devices. It should be appreciated that each of the various elements shown in FIG. 2 may be implemented on the same or different computing devices of a data processing system and in some implementations may operate in a distributed manner across one or more data processing networks.

As shown in FIG. 2, the microservices recommendation computing tool 200 includes a microservices metadata extraction engine 210, a microservices index generator 220, a microservices index 230, a microservices query engine 240, and a microservices search engine 250. The microservices metadata extraction engine 210 comprises an application registration engine 212, an application attribute extraction engine 214, and metadata storage 216. The application registration engine 212 generates user interfaces and logic for registering a composite application including specifying/assigning a unique identifier to the application, specifying the architecture of the application, specifying API schema, the deployment environment, and the like, such as represented by the data structures 260 input by the developer 270 via the development environment and tool used by the developer 270 to create the composite application. These data structures 260 may comprise code repository information 262, deployment environment information 264, and application information 266.

The microservice index generator 220 includes metadata to graph generator 222, a Microservices2Vec, or MS2Vec, computer model 224 and index entry generator 226. The metadata to graph generator 222 generates a graph data structure for a composite application where the graph data structure comprises nodes for the microservices and edges representing dependencies or connections between the microservices, where these edges may be directed edges. Each of the nodes has attributes corresponding to attributes of the microservices extracted from the application data 260 received and processed by the composite application and metadata extraction engine 210.

The MS2Vec computer model 224 is trained to generate a vector encoding of graph data structures representing composite applications and convert the graph data structures into vector representations for each of the microservices in the input graph data structure. The MS2Vec computer model 224 may be a neural network or other machine learning computer model that is trained through machine learning processes on one or more training datasets comprising graph data structures for applications, and learns an embedding of microservice attributes present in graph nodes of input graph data structures, to vector values in a vector representation. Thus, given an input graph data structure, the MS2Vec computer model 224 generates a vector representation for each microservice specified in the nodes of the graph data structure.

The index entry generator 226 generates an index entry in a microservices index 230 in the microservices index data structure storage 280, where the index entry may comprise a unique microservice identifier (ID), microservice metadata information, and vector representation, such that the data record of each microservice in the microservices catalog 202 can be retrieved by using a corresponding microservice ID when the entry is matched with a high level of similarity based on the vector representation, as discussed hereafter. The index entry generated by the index entry generator 226 is stored in the microservices index 230 of the microservices index data structure storage 280 for later use during similarity searches based on specifications of desired microservices as may be input by developer 270.

The microservices query engine 240 provides user interfaces and logic for receiving and processing user microservice search queries, where these microservice search queries comprise specifications of attributes desired in a microservice. That is, the microservices query engine 240 may present one or more user interfaces to a developer 270 with which the developer 270 interacts to submit desired attributes for a microservice. The user interfaces may comprise various fields for specifying the particular desired attributes, and each field may have specific predetermined acceptable values from which the developer may select, or may include free-form entry fields for the user to specify the attribute in a less structured manner. The user interface may include various known user interface elements including drop-down menus, pop-up menus, virtual buttons, text entry fields, and the like. The result is a query 242 having a microservice specification 244 that is submitted to the microservice microservices search engine 250.

The microservices search engine 250 comprises an interface 252 for communicating with the MS2Vec computer model 224 of the microservice index generator 220 to generate a vector representation of the microservice specification 244 in a similar manner as described previously with regard to the graph data structure of the composite application. In this case, however, the microservice specification is considered a single node graph data structure which is encoded by the trained MS2Vec computer model 224.

The microservices search engine 250 further comprises a vector similarity analysis engine 254 that retrieves entries from the microservices index 230 and compares the vector representations of the microservices to the vector representation of the microservice specification 244 and generates a similarity metric based on the comparison. This similarity metric may be, for example, a vector cosine similarity metric or other suitable similarity measure. Cosine similarity between vectors is generally known in the art and thus, a more detailed explanation is not provided herein.

A microservices ranking engine 256 may compare the similarity metrics of the various microservices to a predetermined minimum level of similarity metric to filter out microservices that are not sufficiently similar to the microservices specification 244. The microservices ranking engine 256 may then rank the remaining microservices that have at least the minimum level of similarity metric relative to one another. A top-K number of microservices may be selected from the ranked listing for presentation as recommendations to the developer 270, where K is a configurable parameter, e.g., top-5, top-10, only the top or most similar microservice, or the like.

A recommendation generation engine 258 may generate a recommendation interface 290 that is presented to the developer 270 based on the ranking of microservices and the selection of the top-K microservices from the ranked listing. This recommendation interface 290 may comprise, for each microservice, a description of the microservice which includes the attributes specified in the index entry from the microservices index 230, an indication of the similarity metric, and other suitable information to facilitate an informed decision making on the part of the developer 270. The recommendation interface 290 may further include user selectable interface elements to select a microservice from the recommendation interface 290 listing, which initiates retrieval of the microservice data from the microservice catalog 202 and integration of the microservice data into the development environment used by the developer 270.

The developer 270 may reuse the microservice as is or make modification to the microservice to generate a new microservice, via the development environment. Thus, the recommended microservices in the recommendation interface 290 promote microservice reuse and bootstrapping development of new microservices using best practices and standards as represented by the recommended microservice. It should be appreciated that the developer 270, if modifying the microservice, may register the newly generated microservice with the microservice catalog 202 which then initiates the generation of a corresponding microservice index entry in the manner discussed previously.

Thus, in the operation of the microservices recommendation computing tool 200, there are two primary phases. In a first phase, similarity training is performed to thereby train the MS2Vec computer model 224 and generate the microservices index 230 for a catalog of microservices 202. In a second phase of operation, similarity inferencing is performed, where a developer 270 provides a microservice specification and queries the microservices index for a recommended microservice that has a sufficient similarity to the microservice specification. An objective of the similarity training is to leverage existing information about microservices to create a microservices index data structure comprising vector representations of the attributes of microservices such that similarity based analysis may be able to be used to retrieve microservices that provide desired attributes during composite application development. An objective of the similarity inferencing is to provide a search and recommendation tool that utilizes the generated microservices index data structure to perform an inference based similarity search and analysis to identify microservices that are similar to the microservices specification of a received query and generate recommendations as to microservices that developers can use to develop a composite application.

In the first phase of similarity training, the composite application and metadata extraction engine 210 receives as input organization level data structures 260 for one or more composite applications, which comprise a large amount of information related to microservices at various levels. For the similarity training, the input data comprises code repository information 262 including microservice API schema (e.g., openapi3, swagger, etc.), deployment environment information 264 comprising microservice information such as security schemes, runtimes, etc., and application information 266 comprising information regarding after deployment attributes of microservices that indicate how microservices work together, such as their connections to other microservices.

After receiving the organization level data structures 260, the microservices metadata extraction engine 210 parses the organization level data structures 260 and extracts microservice metadata information at various layers from these data structures 260. To obtain a set of attributes for one or more microservices of a composite application, the microservices metadata extraction engine 210 leverages best practices that address deployment of microservices in multicloud environments. Microservice metadata attributes that are extracted by the microservices metadata extraction engine 210 may include attributes regarding compatibility, portability, and supportability between container images, container runtimes (e.g., Docker, containerd, CRIO, gVisor, etc.), container registries (e.g., OSS, DockerHub, JFrog, etc.), API Schema (e.g., openapi, swagger, etc.), microservice principles (e.g., single responsibility, interface segregation, event-driven, loose-coupling, deployability), and microservice design patterns (e.g., decomposition patterns, integration patterns, shared database, 12-factor compliance, etc.).

An example of microservice metadata information that may be extracted from the input data structures 260 via the composite application and metadata extraction engine 210 is as follows:

{Id: Payment-23, Application: ordering system, Compatability: Debian, Container_runtime: Docker, In_ward_services: [Frontend-23, Database-23], Out_ward_services:[ Shipping-23], Deployment: canary, Integration_pattern: chained, 12_factor_compliance: True, Owner_group: Online sales}

At the organization level, there are hundreds of microservices and for each microservice, microservice metadata information is extracted from applications developed from developers 270. That is, as shown in FIG. 2, the input data structures 260 may comprise the code repository information 262, deployment environment information 264, and application information 266 for a plurality of different composite applications that use one or more microservices. At the organization level, there may be many composite applications across different departments of an organization, and hundreds of microservices used to implement these composite applications. The registration of applications with a code repository via the application registration engine 212 results in the data structures 260 being made available. These data structures are processed by the application attribute extraction engine 214 to extract, for each application, a listing of the microservices used to compose the application and the attributes of these microservices by parsing the data structure 260 and performing key term/phrase and pattern analysis to identify features in the data structures 260 that are indicative of attributes of microservices. In some cases, the application attribute extraction engine 214 may comprise logic that looks to particular portions of the data structures 260, e.g., metadata tags, comments in code, variable definitions, etc., for particular patterns indicative of microservice attributes. The extracted microservice metadata may be stored in the metadata storage 216 and used by the microservices index generator 220 to generate the microservices index 230.

In order to generate a microservices index 230 for similarity search purposes, and recognizing that microservice information contains several attributes with a large amount of variety in the way these attributes are specified due to difference developers 270 developing applications, the microservices index generator 220 of the illustrative embodiments transforms the application information and microservices metadata via data transformations into a graph based representation, where nodes of the graph represent the microservices and the graph structure is attributed with microservices metadata information for each of the microservices. After this data transformation, several graph data structures are obtained, each representing a separate composite application. That is, during the similarity training period, the data for several different applications is used to perform this similarity training and generate a microservices index 230, such that a plurality of graph data structures are generated and used to perform the creation of the microservices index 230. The applications are used to perform this similarity training as the application data provides information about the different architectural styles, technologies and patterns that were leveraged in the application, as opposed to just metadata describing and defining the APIs supported by the microservices. This permits the illustrative embodiments to consider multiple modalities of microservices for index creation, such as design patterns, application architecture, API schema, and the like, which are used to identify similar microservices.

Figure 3:
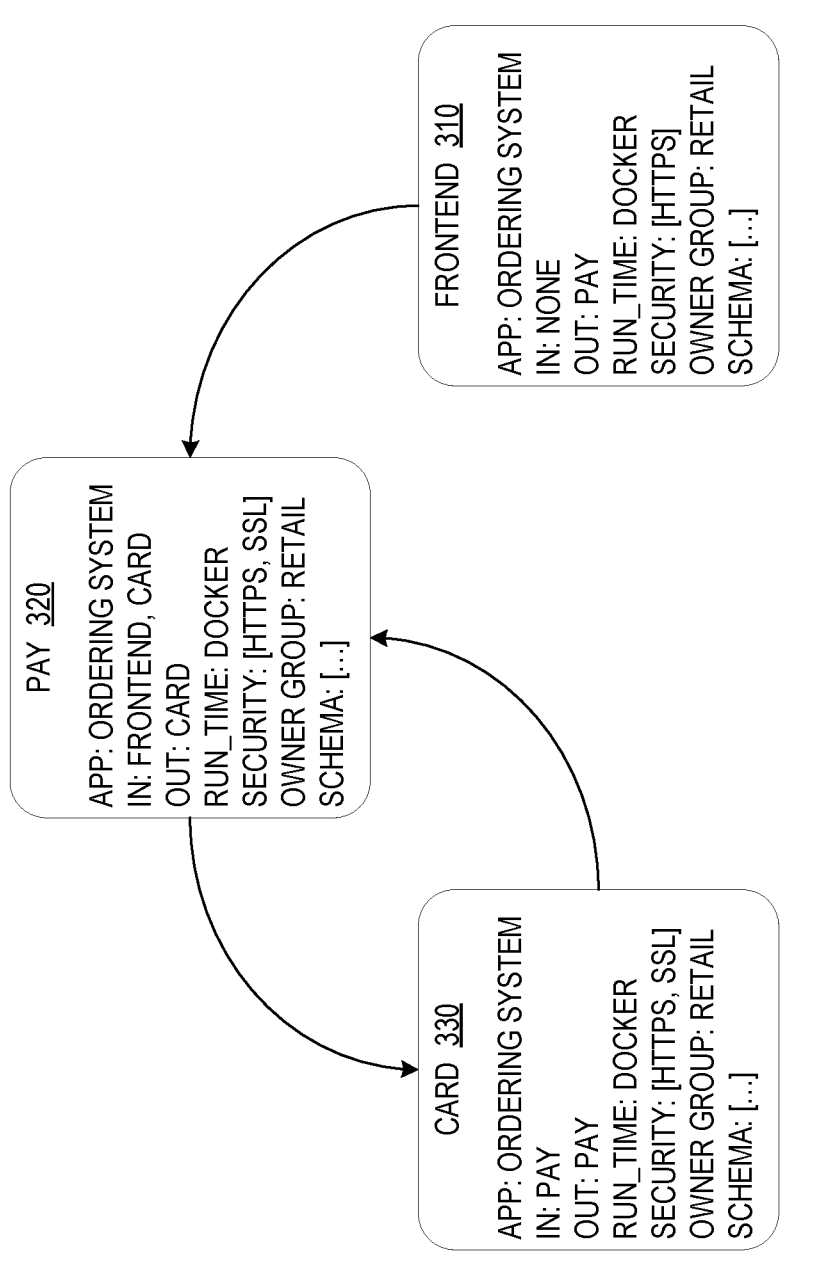
FIG. 3 is an example diagram of a simplified composite application graph data structure in accordance with one illustrative embodiment.

FIG. 3 is an example diagram of a simplified composite application graph data structure in accordance with one illustrative embodiment. The graph data structure 300 in FIG. 3 is for a simple composite application for payment processing involving three microservices represented by nodes 310-330, including a frontend microservice 310, a payment or "pay" microservice 320, and a credit card processing or "card" microservice 330. Each node 310-330 has associated microservice metadata attributes including application name it is associated with, i.e., "ordering system" in this example, input connection, output connection, security, owner group, and schema information. For example, for node 320, the payment microservice is part of the ordering system application, has input from the frontend microservice and the credit card microservice, provides output to the credit card microservice its runtime is Docker, i.e., it is implemented as a docker container, the security used is HTTPS and SSL, its owner group is retail, and then the schema is provided (not shown in detail). The inputs and outputs of the nodes specify the connections, or edges, between the nodes and the directions of these connections.

Thus, in the graph data structure 300 the nodes 310-330 represent microservices and capture the design principles, runtime, schema, and the like, of the corresponding microservices, while the edges capture the actual microservice functionality. The microservice functionality captured by the edges is defined at the application level. For example, a payment microservice supports both card transactions and wire transfers, however at the application level the payment microservice support can be defined to accept only a certain payment type. As described at application level, several microservices are connected with each other and the same microservice may be used across different applications. Inputs and outputs of same microservice can vary based on overall application functionality, with this information being captured in the edges of the graph.

During the similarity learning phase, the graph data structures for a plurality of composite applications that serve as training data, are further processed to generate vector representations of each of the nodes in the graph data structures. That is, in order for a microservices repository and corresponding microservices index 230 to support similarity based searching for microservices, it is required that a representation be provided that encodes the microservice information in a manner that inference based similarity searches can be performed. The microservice index generator 220 comprises the Microservices2Vec (MS2Vec) computer model 224 that learns an encoding of microservice attributes from the training data to thereby convert attributed graphs to numerical features that are represented in a vector sequence.

Figure 4:
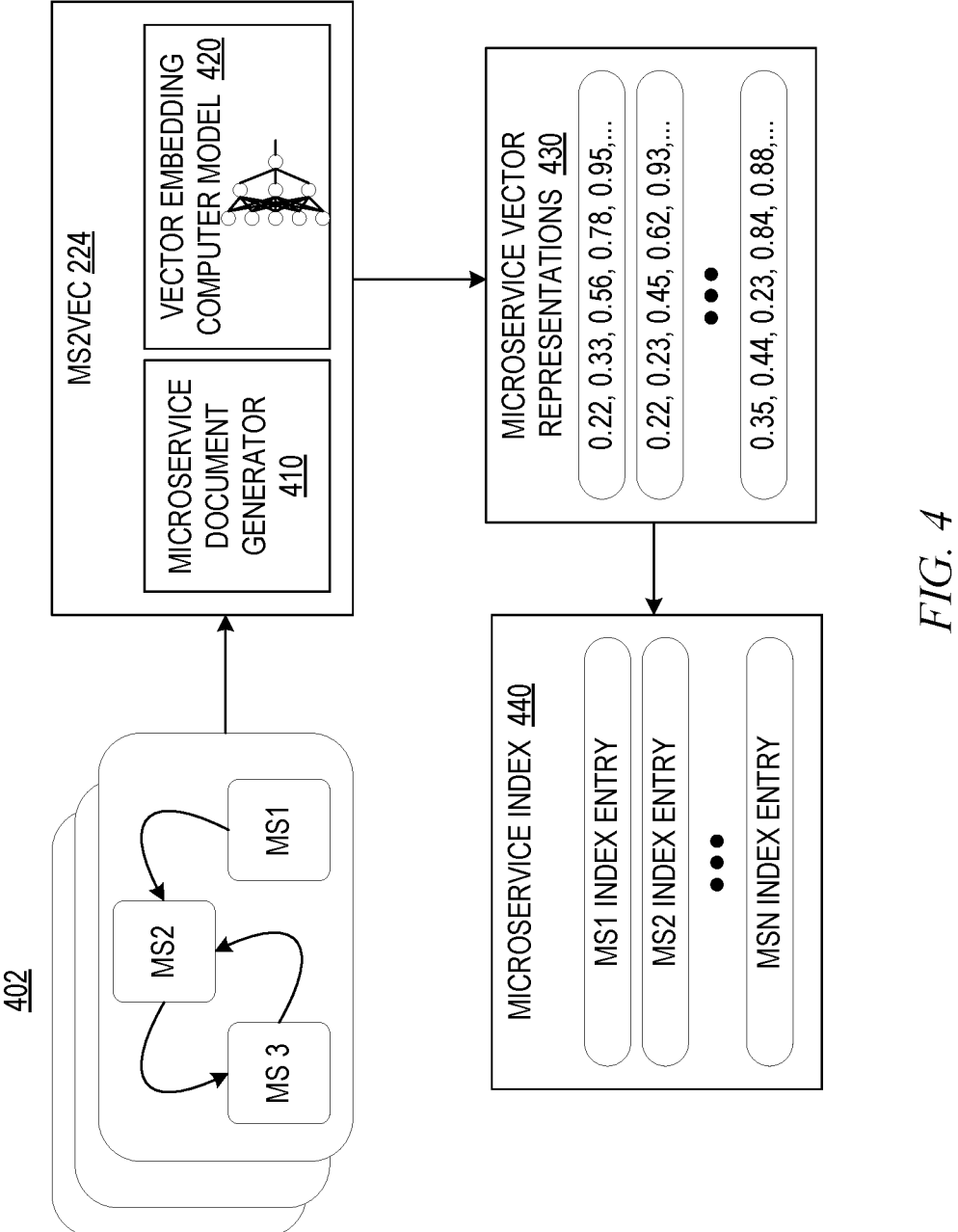
FIG. 4 is an example diagram illustrating a graph embedding mechanism to generate vector representations of microservices in a composite application in accordance with one illustrative embodiment.

FIG. 4 is an example diagram illustrating a graph embedding mechanism to generate vector representations of microservices in a composite application in accordance with one illustrative embodiment. As shown in FIG. 4, the MS2Vec computer model 400, which may be an example of MS2Vec computer model 224 in FIG. 2, comprises a microservice document generator 410 and a vector embedding engine 420. The MS2Vec computer model 400 receives the graph data structures 402 and the microservice document generator 410 generates, for each microservice in each graph data structure 402, a corresponding document. For example, each attributed graph data structure 402 is converted to a string using programming language tools, such as python for example, and each converted string represents one document. Each document contains nodes, edges, and metadata that may specify microservice design attributes, API schema, runtimes, incoming and outgoing microservice connections, etc. The attributed graph captures the microservice connective and usage at the application level and thus, by converting this attributed graph data structure 402 to a document, this connectivity and usage is captured along with the other attributes of the microservices.

The vector embedding engine 420 comprises a neural network or other machine learning computer model 422 that learns an embedding model for embedding input documents specifying attributes of microservices and numerical values providing a representation of these attributes. In some illustrative embodiments, the vector embedding engine 420 may comprise an autoencoder. The autoencoder may be trained by generating an encoding of an input document and then attempting to recreate the input from the encoding. An error between the generated input and the actual input may be determined and machine learning training logic may adjust operational parameters of the autoencoder so as to minimize the error. This process may be repeated through multiple iterations, or epochs, and across multiple different documents representing different microservices in a training dataset, which may be unlabeled data. The result is a trained encoder that learns a representation vector space for the microservice documents such that similar microservices are closer and dissimilar microservices are further apart from each other in this vector space. Based on this learned representation vector space, the trained encoder of the MS2Vec computer model 400 generates encodings and generates vector representations 430 for these microservices, i.e., embeddings for attributes for microservices specified in input documents corresponding to input graphs 402.

It should be appreciated that the illustrative embodiments are not limited to autoencoders, and in other illustrative embodiments may utilize other types of machine learning computer models. For example, if training data is provided with corresponding labels, or ground truth, a supervised machine learning process may be applied to a machine learning computer model based on these labels to thereby train the machine learning computer model to generate appropriate vector representations for attributes of microservices by comparing the vector representation of the training data generated by the machine learning computer model to a vector representation corresponding to the labels.

Thus, the microservice to vector (MS2vec) computer model 400 provides a neural network embedding technique which takes application graph data structures 402 as input and returns vector representations, comprising sequences of numerical values or embeddings, for each microservice of each application graph data structure 402. Based on these vector representations 430, the index entry generator 226 generates corresponding microservice index entries 440. Each index entry generated by the index entry generator 226 may comprise a microservice ID, microservice metadata information, and vector representation 430 as generated by the MS2vec computer model 400. The microservice ID provides a link to the microservice repository for retrieval of the microservice data, e.g., container or the like, for presentation to developers 270 based on matching the microservice in an inference based similarity search. The microservice metadata information provides information that can be presented to developers via a search interface so that the developer 270 can make informed decisions as to which microservice to select for use in developing a composite application.

The index entries generated by the index entry generator 226 may be stored in the microservices index 230. It should be appreciated that once trained through the above process, whenever a new application comprising a new microservice or set of microservices is generated, the microservice metadata extraction engine 210 and microservices index generator 220 may be utilized to generate microservice document(s) for the new microservice(s) and corresponding vector representation(s) for indexing in the microservices index 230. The microservice index 230 may be used as a basis for inference based similarity searches via the microservices query engine 240 and microservices search engine 250 during the similarity inferencing phase of operation.

That is, during the similarity inferencing phase of operation, a developer 270 or the like, may use the microservices query engine 240 to search the microservice index 230 for similar microservices to a microservice specification presented in an input query and get recommendations as to microservices that may be utilized. That is, during runtime operation, the developer 270 may initiate a search for a microservice by providing input to a microservice query engine 240 via one or more user interfaces so present a microservices specification which is a mock-up of a required microservice specifying the desired schema, connected services, runtime, security schemes, etc., that the developer 270 wishes the microservice to have. For example, if a developer 270 is looking to build a microservice for a "payment" service, then the developer 270 can create a schema with all possible routes of service, specify in ward and outgoing services, run times, etc. It should be appreciated that this specification need not include all of the attributes of a microservice, but the more attributes the developer can specify, the better the resulting microservice recommendations will be as there is more information upon which to generate a vector representation.

The query 242 having microservice specification 244 may be submitted to the microservices search engine 250 via the microservices query engine 240. The microservices search engine 250 uses the microservice specification 244 and the microservice index 230 to find similar microservices according to the microservice specification 244. The microservice search engine 250 obtains a vector representation for the microservice specification 244 in a similar manner to that described above using the trained MS2Vec computer model 400. That is, a similar document generation for the microservice and data transformation to a vector representation is performed and then a vector similarity analysis engine 254 performs a vector similarity comparison to generate a similarity score or value.

For example, the vector representation of the microservice specification 244 is used as a base vector and all other microservice vector representations are retrieved from the microservice index 230. A cosine similarity metric, or other similarity or distance based metric, may then be calculated for the base vector with respect to all other vector representations for all other microservices as retrieved from the index 230. The most similar vector representations with high cosine similarity are selected as candidates for recommendation to be presented to the developer 270 in response to the query 242. By "most" similar vector representations, what is meant is the vector representations that have the shortest distances relative to the base vector representation in a vector space, relative to other vector representations. What is meant by "high" cosine similarity is a cosine similarity that is equal to or above a given threshold, or minimum level of similarity. The "most" similar vector representations may be selected as the top-K vector representations that have the shortest distances to the base vector, or highest similarity metric, where the value of K is a user specified parameter and may vary from one implementation to another. The microservices ranking engine 256 may perform the operations of identifying the most similar vector representations by ranking the similarity metrics of the various microservices in the index 230 relative to one another and then selecting the top-K vector representations, where K can be 1 or more.

Once the most similar microservice(s) to the microservice specification 244 is/are identified through the inference based similarity analysis of the microservices search engine 250, a recommendation generation engine 258 may operate to identify recommendations for presentation to the developer 270 as results of the query 242. In some cases, this may be merely returning the ranked listing in a user interface such that the user can select an entry and thereby retrieve the microservice data for the selected entry in the ranked listing. In other cases, additional evaluations of the most similar microservice(s) may be performed to adjust the ranking and/or select one or more microservices for presentation to the developer 270 as results of the query 242. For example, an additional evaluation of the top-K ranked microservice(s) may be further analyzed with regard to "best practices", "in-efficiencies", and the like.

For example, the metadata information for the top-K ranked microservices, e.g., top-5, may be retrieved from the index entry corresponding to these microservices. A set of subject matter expert specified best practices and inefficiencies may be used to compare to the metadata information for these microservices to re-rank the microservices relative to one another. For example, one or more subject matter experts may specify a deployment type, integration pattern, security schemes, or the like, that represent current best practices. Those microservices whose metadata information indicates that they implement these best practices may be more highly re-ranked relative to the other microservices in the top-K ranked microservices. Each matching best practice may serve as a weight or additional value added to the similarity score for those microservices that implement those best practices. Similarly, subject matter experts may specify inefficiencies in microservices, such as run time supported, compatibility, 12_factor_compliance, and the like, such that microservices whose metadata indicate that they are inefficient based on a comparison to these subject matter expert specified inefficiencies, are weighted less, or even negatively weighted, relative to the other microservices. In this way, the initial top-K ranked microservices may be re-ranked.

The final ranking of microservices may be used to either present all of the top-K microservices to the developer 270 via a user interface output for selection of one of the microservices, or a top ranked microservice may be returned as the most similar microservice matching the developer provided query 242. The user interface that presents the results of the inference based similarity search may take many different forms, any of which are intended to be within the spirit and scope of the present invention. In some illustrative embodiments, the user interface presenting the results may have user selectable interface elements for selecting one of the microservices presented to the developer 270 for retrieval of the microservices data from the microservices repository for additional use in developing a composite application, i.e., integration with the developers development environment. This may involve, for example, retrieving the container image for the microservice and providing it to the development environment for use in further specifying the composite application. This may involve the developer 270 further modifying the retrieved microservice to create a new microservice which may then be registered with the microservice repository and mechanisms of the illustrative embodiments used to index the new microservice.

Thus, through the mechanisms of the illustrative embodiments, developer re-use of existing similar microservices with respect to a developer provided microservice specification is promoted, as well as development of new microservices through bootstrapping such development of new microservices by providing similar microservices as a baseline for further development of microservices. Moreover, the mechanisms of the illustrative embodiments help to promote developers using best practices and avoiding inefficiencies in microservices by providing the re-ranking capabilities for promoting microservices that use best practices and avoid inefficiencies.

As described above, the illustrative embodiments of the present invention are specifically directed to an improved computing tool that automatically learns a vector encoding for attributes of microservices, automatically generates an index of such microservices, and provides an inference based similarity search engine for locating microservices that are most similar to a given query's microservice specification. All of the functions of the illustrative embodiments as described herein are intended to be performed using automated processes without human intervention other than receiving certain inputs and outputting recommendations to the submitter of search queries providing microservice specifications. While a human being, e.g., a developer, may utilize the mechanisms of the illustrative embodiments to assist them in developing composite applications using one or more microservices, the illustrative embodiments of the present invention are not directed to actions performed by the developer, but rather logic and functions performed specifically by the improved computing tool on the microservices and microservice specifications provided in submitted queries. Moreover, even though the present invention may provide an output of microservice recommendations that ultimately assists human beings in developing composite applications, the illustrative embodiments of the present invention are not directed to actions performed by the human being viewing the results of the processing microservices and microservice search queries, but rather to the specific operations performed by the specific improved computing tool of the present invention which facilitate the developer generating composite applications using best practices and reducing inefficiencies in microservices. Thus, the illustrative embodiments are not organizing any human activity, are not directed to any mental processes, and instead are in fact directed to the automated logic and functionality of an improved computing tool.

Figure 5:
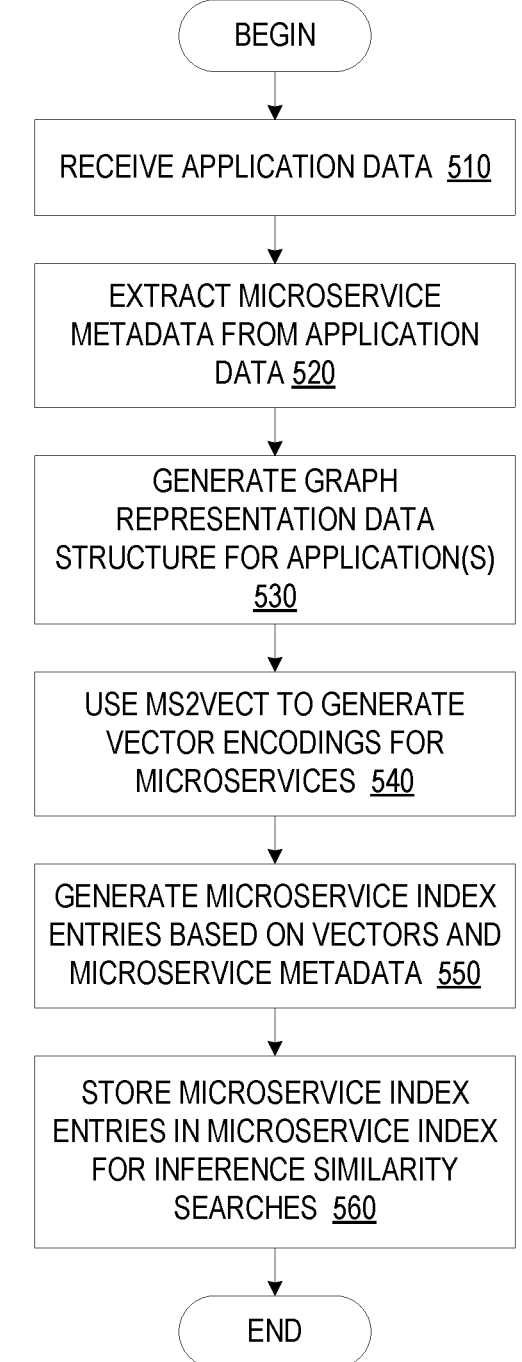
FIG. 5 is a flowchart outlining an example operation for generating a microservices catalog and microservices index in accordance with one illustrative embodiment.
Figure 6:
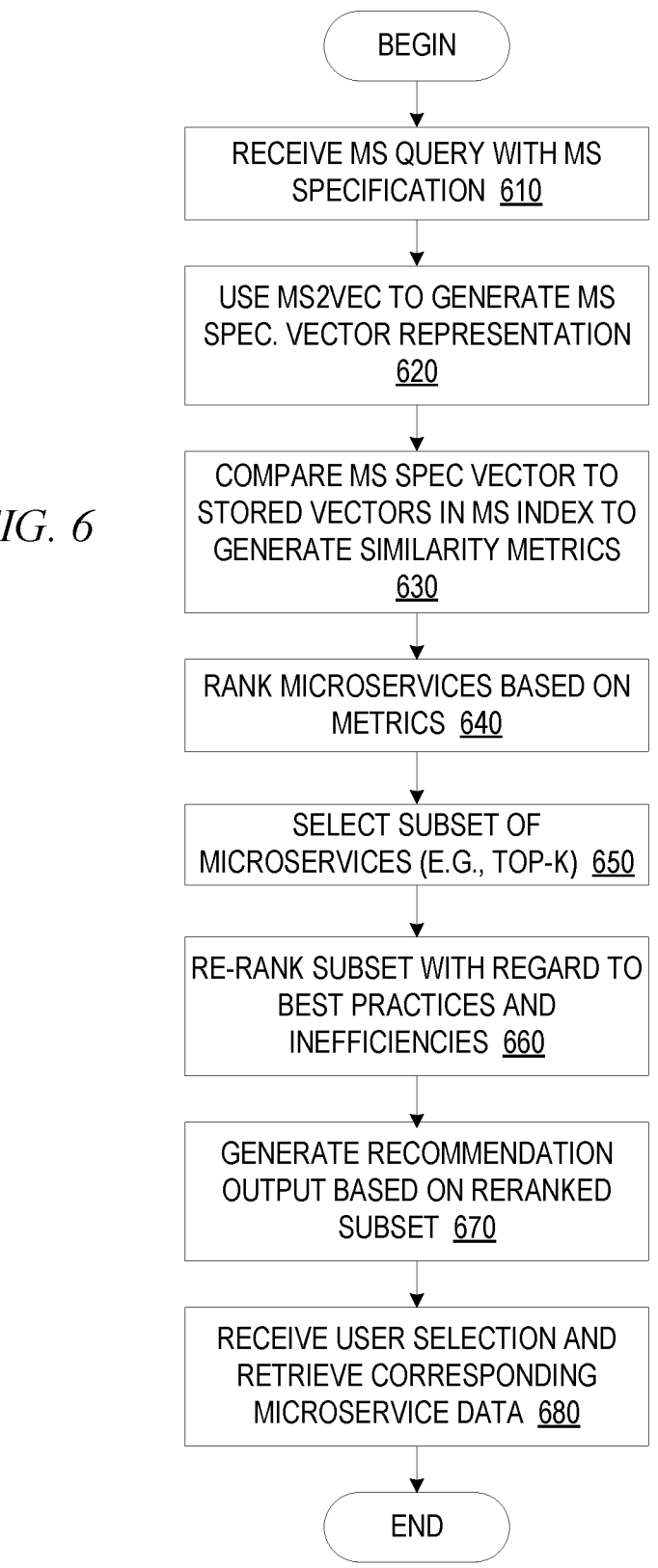
FIG. 6 is a flowchart outlining an example operation for generating microservice recommendations based on a specification in accordance with one illustrative embodiment.

FIGS. 5-6 present flowcharts outlining example operations of elements of the present invention with regard to one or more illustrative embodiments. It should be appreciated that the operations outlined in FIGS. 5-6 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 5-6, and may, in some cases, make use of the results generated as a consequence of the operations set forth in FIGS. 5-6, the operations in FIGS. 5-6 themselves are specifically performed by the improved computing tool in an automated manner.

FIG. 5 is a flowchart outlining an example operation for generating a microservices catalog and microservices index in accordance with one illustrative embodiment. The operation outlined in FIG. 5 may be used during a similarity training phase which trains the MS2Vec computer model and generates a microservices index for use in performing inference based similarity searches for microservices.

As shown in FIG. 5, the operation starts by receiving application data from source data structures, which may comprise code repository information, deployment environment information, and application information (step 510). For each application, microservices metadata are extracted from the application data (step 520). The microservices metadata for each application are transformed into an attributed graph representation data structure having nodes corresponding to microservices and edges corresponding to the functionality and connections between microservices, where the nodes have attributes corresponding to attributes of microservices specified in the metadata (step 530). The attributed graph representation data structures are input to a microservices to vector (MS2Vec) computer model which is trained, through a machine learning process, to generate vector encodings for the attributes of the microservices in each graph (step 540). The vector representations of the microservices are then used as a basis for generating index entries for each microservice (step 550). The index entries are stored in a microservice index data structure (step 560) and the operation terminates.

FIG. 6 is a flowchart outlining an example operation for generating microservice recommendations based on a specification in accordance with one illustrative embodiment. The operation outlined in FIG. 6 assumes a microservices index has been generated where entries in the microservice index include microservice metadata and a vector representation of the microservice attributes, such as may be generated automatically through the mechanisms of the illustrative embodiments as described above. The operation in FIG. 6 may be implemented as part of a runtime similarity inference phase of operation.

As shown in FIG. 6, the operation starts by receiving a search query from a user, e.g., developer, for a microservice, where the query includes a microservice specification (step 610). The microservice specification is converted to a vector representation via a MS2Vec computer model of the illustrative embodiments (step 620). The specification vector representation is then compared to the vector representations of the microservices in the microservices index to calculate, for each microservice in the microservice index, a similarity metric (step 630). Based on the similarity metrics for the microservices in the microservices index, a ranking of the microservices relative to each other is generated (step 640), and the top-K microservices are identified, i.e., those having vector representations that are the most similar to the specification vector representation as indicated by the similarity metrics (step 650).

The top-K microservices are then further evaluated with regard to best practices and inefficiencies to re-rank the top-K microservices by weighting the similarity metrics based on their corresponding microservices adherence to best practices and avoidance of inefficiencies specified by subject matter experts (step 660). The resulting ranked listing of microservices is then used to generate a recommendation output, e.g., user interface, that is presented to the source of the original search query (step 670). A user selection of a microservice from the recommendation output may then be received and the corresponding microservice data retrieved from a microservice repository and presented to the development environment of the user for use in developing a composite application (step 680). The operation then terminates.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides a microservices recommendation computing tool. The improved computing tool implements mechanism and functionality, such as learning of microservice attribute encodings, generation of a microservices index, processing microservice search queries using inference based similarity searches, evaluating matches with microservices with regard to best practices and inefficiencies, and generation of recommendations for use in developing composite applications and new microservices, which cannot be practically performed by human beings either outside of, or with the assistance of, a technical environment, such as a mental process or the like. The improved computing tool provides a practical application of the methodology at least in that the improved computing tool is able to assist in the composite application and microservices development process by providing automated artificial intelligence capabilities that can provide greater insight into the vast number of existing microservices when developers are developing composite applications and/or their own new microservices.

FIG. 7 is an example diagram of a distributed data processing system environment in which aspects of the illustrative embodiments may be implemented and at least some of the computer code involved in performing the inventive methods may be executed. That is, computing environment 700 contains an example of an environment for the execution of at least some of the computer code involved in performing the inventive methods, such as microservices recommendation computing tool 200. In addition to block 200, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 200, as identified above), peripheral device set 714 (including user interface (UI), device set 723, storage 724, and Internet of Things (IOT) sensor set 725), and network module 715. Remote server 704 includes remote database 730. Public cloud 705 includes gateway 740, cloud orchestration module 741, host physical machine set 742, virtual machine set 743, and container set 744.

Computer 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

Processor set 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 200 in persistent storage 713.

Communication fabric 711 is the signal conduction paths that allow the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 712 is any type of volatile memory now known or to be developed in the future. Examples include dynamic type random access memory (RAM) or static type RAM. Typically, the volatile memory is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

Persistent storage 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface type operating systems that employ a kernel. The code included in block 200 typically includes at least some of the computer code involved in performing the inventive methods.

Peripheral device set 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

Network module 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

Remote server 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

Public cloud 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for indexing microservices for optimized querying based on microservice attributes, the method comprising:

generating a plurality of application graph data structures, wherein each node in an application graph data structure specifies a corresponding microservice and has corresponding microservice attribute information, and wherein each edge between nodes in the application graph data structure specifies a microservice functionality between microservices of nodes connected by the edge;

executing a data transformation operation on the application graph data structures to generate, for each node in each application graph data structure, a corresponding microservice document specifying microservice attributes of the corresponding microservice;

executing a machine learning training operation on an embedding computer model based on a plurality of the microservice documents, wherein the machine learning training operation trains the embedding computer model to learn a representation vector space for representing microservices as vector representations;

executing the trained embedding computer model on the plurality of microservice documents to generate corresponding vector representations;

compiling the vector representations into entries of a microservice index data structure; and processing queries for microservices based on the vector representations in the entries of the microservice index data structure.

2. The computer-implemented method of claim 1, wherein processing queries for microservices based on the vector representations in the entries of the microservice index data structure comprises:

receiving a microservice query comprising a microservice specification;

executing the embedding computer model on the microservice specification to generate a microservice specification vector representation;

executing a similarity based search of the microservice index data structure based on a similarity analysis between the microservice specification vector representation and vector representations in entries of the microservice index data structure; and returning results of the similarity based search of the microservice index data structure to a source of the microservice query.

3. The computer-implemented method of claim 2, wherein the similarity analysis comprises, for each pairing of the microservice specification vector representation and a vector representation of an entry in the microservice index data structure, determining a similarity metric based on a similarity metric calculation function.

4. The computer-implemented method of claim 2, wherein returning results of the similarity based search of the microservice index data structure comprises:

ranking microservices corresponding to the entries in the microservice index data structure relative to one another based on their corresponding similarity metrics to generate a ranked listing;

selecting a subset of microservices from the ranked listing;

executing an analysis of microservice metadata information stored in entries of the microservice index data structure corresponding to the subset of microservices to determine, for each microservice in the subset of microservices, whether the microservice implements specified best practices and avoids specified inefficiencies;

re-ranking the microservices in the subset of microservices based on results of the analysis; and generating a recommendation output that recommends one or more of the microservices in the subset of microservices as a result of the received microservice query.

5. The computer-implemented method of claim 4, wherein the recommendation output is a user interface having user selectable user interface elements that, when selected by a user, retrieve a corresponding microservice container from a microservice repository into a development computer environment for developing a composite application.

6. The computer-implemented method of claim 1, wherein the embedding computer model is a neural network.

7. The computer-implemented method of claim 1, wherein the embedding computer model is an autoencoder.

8. The computer-implemented method of claim 1, wherein generating the graph data structures comprises, for each composite application in a plurality of composite applications:

receiving input data comprising code repository information, deployment environment information, and application information;

extracting microservice metadata information for the microservices implemented in the composite application from the input data; and generating a graph of the composite application based on the extracted microservice metadata information.

9. The computer-implemented method of claim 8, wherein the microservice metadata information comprises at least one of an owner of the microservice, application information specifying an application type with which the microservice operates, compatibility information, container runtime information, connectivity information to other microservices, deployment environment information, or integration pattern information.

10. The computer-implemented method of claim 8, wherein each entry in the entries in the microservice index include, for a corresponding microservice, a microservice identifier, microservice metadata information, and a vector representation for the corresponding microservice.

11. A computer program product comprising a computer readable storage medium having a computer readable program stored therein, wherein the computer readable program, when executed in a data processing system, causes the data processing system to:

generate a plurality of application graph data structures, wherein each node in an application graph data structure specifies a corresponding microservice and has corresponding microservice attribute information, and wherein each edge between nodes in the application graph data structure specifies a microservice functionality between microservices of nodes connected by the edge;

execute a data transformation operation on the application graph data structures to generate, for each node in each application graph data structure, a corresponding microservice document specifying microservice attributes of the corresponding microservice;

execute a machine learning training operation on an embedding computer model based on a plurality of the microservice documents, wherein the machine learning training operation trains the embedding computer model to learn a representation vector space for representing microservices as vector representations;

execute the trained embedding computer model on the plurality of microservice documents to generate corresponding vector representations;

compile the vector representations into entries of a microservice index data structure; and process queries for microservices based on the vector representations in the entries of the microservice index data structure.

12. The computer program product of claim 11, wherein processing queries for microservices based on the vector representations in the entries of the microservice index data structure comprises:

receiving a microservice query comprising a microservice specification;

executing the embedding computer model on the microservice specification to generate a microservice specification vector representation;

executing a similarity based search of the microservice index data structure based on a similarity analysis between the microservice specification vector representation and vector representations in entries of the microservice index data structure; and returning results of the similarity based search of the microservice index data structure to a source of the microservice query.

13. The computer program product of claim 12, wherein the similarity analysis comprises, for each pairing of the microservice specification vector representation and a vector representation of an entry in the microservice index data structure, determining a similarity metric based on a similarity metric calculation function.

14. The computer program product of claim 12, wherein returning results of the similarity based search of the microservice index data structure comprises:

ranking microservices corresponding to the entries in the microservice index data structure relative to one another based on their corresponding similarity metrics to generate a ranked listing;

selecting a subset of microservices from the ranked listing;

executing an analysis of microservice metadata information stored in entries of the microservice index data structure corresponding to the subset of microservices to determine, for each microservice in the subset of microservices, whether the microservice implements specified best practices and avoids specified inefficiencies;

re-ranking the microservices in the subset of microservices based on results of the analysis; and generating a recommendation output that recommends one or more of the microservices in the subset of microservices as a result of the received microservice query.

15. The computer program product of claim 14, wherein the recommendation output is a user interface having user selectable user interface elements that, when selected by a user, retrieve a corresponding microservice container from a microservice repository into a development computer environment for developing a composite application.

16. The computer program product of claim 11, wherein the embedding computer model is a neural network.

17. The computer program product of claim 11, wherein the embedding computer model is an autoencoder.

18. The computer program product of claim 11, wherein generating the graph data structures comprises, for each composite application in a plurality of composite applications:

receiving input data comprising code repository information, deployment environment information, and application information;

extracting microservice metadata information for the microservices implemented in the composite application from the input data; and generating a graph of the composite application based on the extracted microservice metadata information.

19. The computer program product of claim 18, wherein the microservice metadata information comprises at least one of an owner of the microservice, application information specifying an application type with which the microservice operates, compatibility information, container runtime information, connectivity information to other microservices, deployment environment information, or integration pattern information.

20. An apparatus comprising:

at least one processor; and at least one memory coupled to the at least one processor, wherein the at least one memory comprises instructions which, when executed by the at least one processor, cause the at least one processor to:

generate a plurality of application graph data structures, wherein each node in an application graph data structure specifies a corresponding microservice and has corresponding microservice attribute information, and wherein each edge between nodes in the application graph data structure specifies a microservice functionality between microservices of nodes connected by the edge;

execute a data transformation operation on the application graph data structures to generate, for each node in each application graph data structure, a corresponding microservice document specifying microservice attributes of the corresponding microservice;

execute a machine learning training operation on an embedding computer model based on a plurality of the microservice documents, wherein the machine learning training operation trains the embedding computer model to learn a representation vector space for representing microservices as vector representations;

execute the trained embedding computer model on the plurality of microservice documents to generate corresponding vector representations;

compile the vector representations into entries of a microservice index data structure; and process queries for microservices based on the vector representations in the entries of the microservice index data structure.

* * * * *